United States Patent [19]

Knight

[11] 4,062,926

[45] * Dec. 13, 1977

[54] SULFUR DIOXIDE REMOVAL USING THERMALLY CRUSHED NAHCOLITE

[75] Inventor: John H. Knight, Aurora, Colo.

[73] Assignee: The Superior Oil Company, Houston, Tex.

[*] Notice: The portion of the term of this patent subsequent to Apr. 19, 1994, has been disclaimed.

[21] Appl. No.: 559,816

[22] Filed: Mar. 19, 1975

[51] Int. Cl.$^2$ .......................... B01J 8/00; C01B 17/00
[52] U.S. Cl. .................................................. 423/244
[58] Field of Search ............................. 423/242–244; 241/1

[56] References Cited

U.S. PATENT DOCUMENTS 3,505,008  4/1970  Frevet et al. .......................... 423/244
3,880,629  4/1975  Dulin et al. ....................... 423/244 X Primary Examiner—O. R. Vertiz
Assistant Examiner—Gregory A. Heller
Attorney, Agent, or Firm—Arnold, White & Durkee

[57] ABSTRACT

Sulfur dioxide is removed from a gas stream, such as that generated by the combustion of a sulfur-containing fuel or ore processing, by introducing particulate nahcolite into the gas stream in a high temperature zone. The high temperature zone provides an environment for the size reduction of the particulate nahcolite and an effective environment for the removal of the sulfur dioxide. The size reduction of particulate nahcolite is accomplished by a thermal crushing process.

5 Claims, 1 Drawing Figure

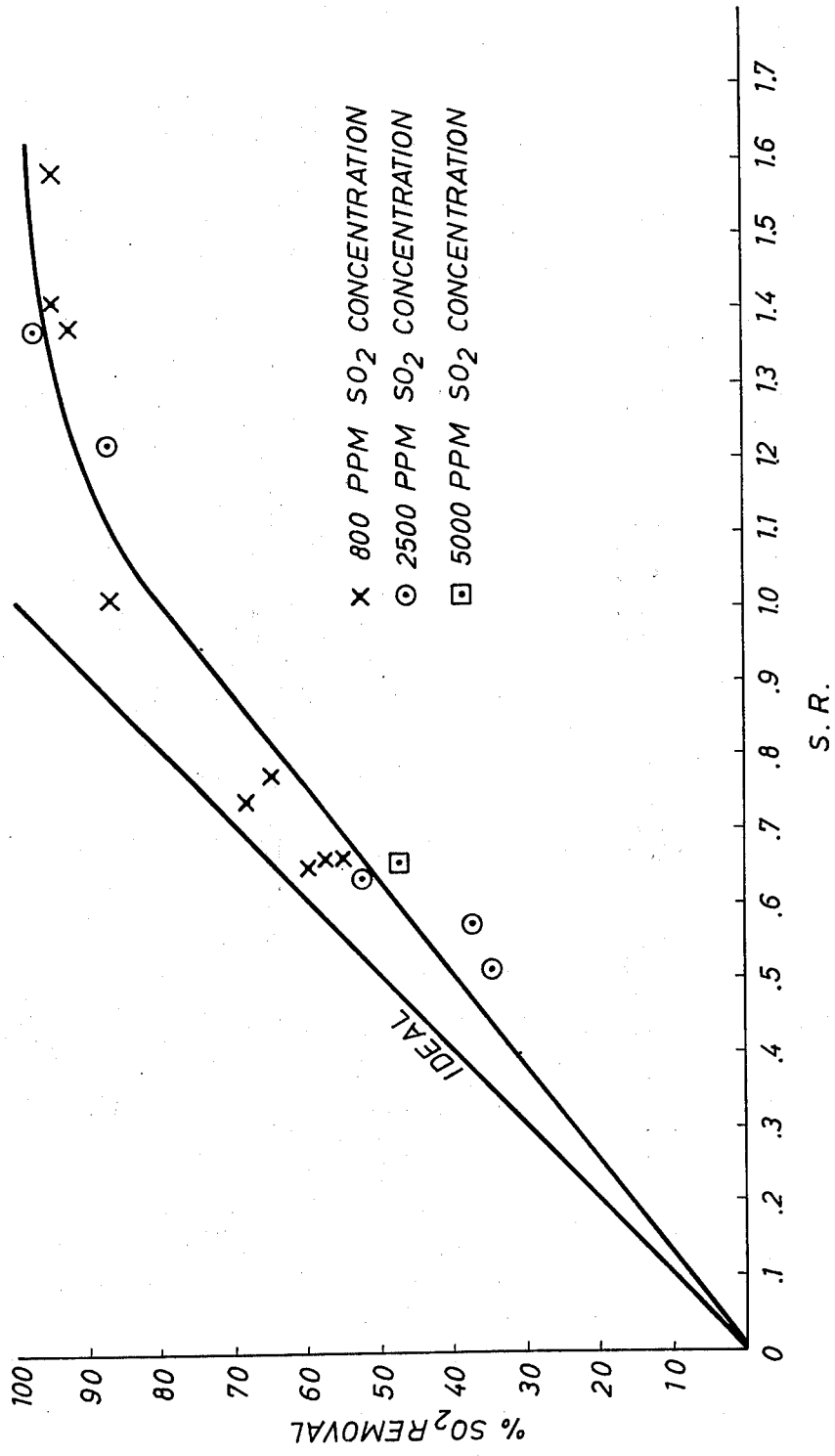

SULFUR DIOXIDE REMOVAL USING THERMALLY CRUSHED NAHCOLITE

BACKGROUND OF THE INVENTION

1. Field of the Invention

This invention relates to a method of removing sulfur dioxide from gas streams, such as those generated by the combustion of a sulfur-containing fuel or those produced by ore processing, such as in smelting furnaces, etc. More particularly, the present invention relates to a method of removing sulfur dioxide wherein the active agent in the removal is nahcolite.

2. Description of the Prior Art

Sulfur dioxide is one of the major pollutants from the burning of sulfur-bearing fuels, processing ores, etc. The major tonnage of sulfur dioxide is discharged to the air from steam power plants and furnaces which typically burn coal and residual oils ranging in sulfur content from one to four percent and produce a flue gas concentration of sulfur dioxide ranging from 400 to about 4,000 parts per million. Processes such as ore processing produce sulfur dioxide concentrations up to 20,000 PPM in the flue gases. It has been estimated that some 25 million tons of sulfur dioxide per year are poured into the atmosphere of the United States. This has caused a tremendous pollution problem and an onslaught of proposed techniques for reducing the sulfur dioxide content of flue gases or stack gases from burning combustible products or ore processing.

In attempts to remove the sulfur dioxide from the flue gas, a number of different processes have been proposed and tried. There are numerous suggestions that the sulfur dioxide can be removed from flue gases by washing the flue gases with aqueous solutions of alkaline materials. Unfortunately, field trials using wet scrubbers have been somewhat disappointing and the degree of sulfur dioxide removal has been discouraging. Due to the failure of such wet scrubbing systems, considerable attention has been recently directed to solid systems or other types of systems where the sulfur dioxide can be removed from the flue gas without using an aqueous scrubbing medium.

For example, it has been suggested that sulfur dioxide can be separated from a flue gas on solid absorbants, such as calcium and sodium carbonate. Because sodium carbonate reacts slowly with sulfur dioxide at normal flue gas temperatures, even more recent proposals have suggested that the flue gas can be contacted with a molten bath of sodium carbonate, with the higher temperature increasing the rate of reaction.

Still further, very recent attention has been given to the injection of fine powders into a furnace so as to react with or absorb the sulfur dioxide, removing it from the flue gas. However, reports of a maximum of only about 40 percent sulfur dioxide removal through this procedure have been made. One of the principal materials proposed for such injection is limestone powder, with some limestones being more effective than others. A further material which has been suggested for the removal of sulfur dioxide from a gas stream is naturally occurring trona. Note, for example, U.S. Pat. No. 3,823,676 to Cook.

The removal of sulfur dioxide and particulate matter from flue gases through the use of an alkali metal bicarbonate has been suggested in U.S. Pat. Nos. 3,505,008 and 3,589,863 to Ludo K. Frevel and Leonard J. Kressley. The former suggests the removal of fly ash and sulfur dioxide from a gas stream by flowing the gas stream through a thin porous bed containing alkali metal bicarbonate crystalline solids having a mesh size predominantly within the range of from about 20 to about 120 mesh. The latter patent suggests the removal of sulfur dioxide and particulate matter from a gaseous stream by contacting the gaseous stream with porous alkali metal bicarbonate aggregates. While each of these methods is somewhat effective in the removal of sulfur dioxide from a flue gas, neither method is sufficiently effective to be commercially attractive.

Co-pending application Ser. No. 559,930 filed Mar. 19, 1975 in the name of John H. Knight and entitled Thermal Crushing of Alkali Compounds, discloses a method by which the sulfur dioxide content of a flue gas is reduced by introducing into the flue gas containing sulfur dioxide or other gas impurities a thermally crushed alkali compound, preferably thermally crushed nahcolite. In accordance with the disclosure of this application, the thermally crushed powder is formed in a separate thermal crushing zone, with the thermally crushed powder being transported to a further contact zone for contact with cooled flue gas at a temperature up to 1,500° F. While the process set forth in this co-pending application is effective in the removal of 90 percent or more of the sulfur dioxide content of the flue gas, this method suffers from an economic disadvantage, due to the requirement of a thermal crushing zone separate and apart from the boiler, furnace, incinerator, or other unit providing a high temperature zone and the necessary transporting of the thermally crushed powder to a further zone for contact with the flue gas.

SUMMARY OF THE INVENTION

The present invention provides an advantageous method of removing sulfur dioxide from a gas stream generated by the combustion of a sulfur-containing fuel, by ore processing or other means. The method of the present invention comprises introducing into a high temperature zone (temperature higher than 1500° F) of a boiler, furnace, incinerator, etc., particulate nahcolite in an amount effective to reduce the sulfur dioxide content of the gas stream present in the high temperature zone. The high temperature zone provides an environment for the thermal crushing of the particulate nahcolite so as to produce a thermally crushed nahcolite powder. The thermally crushed nahcolite powder is effective in the removal of the sulfur dioxide.

Preferably, in accordance with the present invention, to achieve the thermal crushing environment, the high temperature zone is maintained at a temperature above 1500° F. To achieve the most efficient thermal crushing of the particulate nahcolite, the particulate nahcolite is brought into direct contact with high temperature gases sufficient to cause thermal crushing. It is presumed that the small particles formed by thermal crushing increase the overall rate of reaction, including mass transfer rates, resulting in very rapid removal of $SO_2$.

The particulate nahcolite is preferably introduced into a high temperature portion of a combustion zone so as to provide a stoichiometric ratio of thermally crushed nahcolite to sulfur dioxide within the range of about 0.9 to about 3.0, preferably 0.9 to 1.0. The contact time between the thermally crushed nahcolite and sulfur dioxide impurities within the gas stream is generally up to about ten seconds, with a period of contact of from about one to about 6 seconds being preferred. It appears that the reaction is essentially complete after one to two seconds residence time. The thermally crushed nahcolite powder with combined sulfur dioxide can be removed from the gas stream after this contact time.

Test work has shown that the method of the present invention allows most effective removal of the sulfur dioxide content of the gas stream, with reduction of 90+ percent being typically achieved with a stoichiometric ratio between 0.9 and 1.0 with a contact residence time of 1 to 6 seconds. While the method of this application has the disadvantage, compared with the above described co-pending application, that some solid deposits will inevitably form in the high temperature zone due to the failure of the gas stream to transport all of the particles out of the combustion zone, this disadvantage is outweighed in some applications when economics are considered, such as type of equipment, material of construction, etc., since the lack of need for a separate thermal crushing zone makes the method of this invention substantially more economically attractive. Also, in some applications, such as metal processing furnaces (copper, lead, iron, etc.) the solids that are deposited or dropped out of the gas stream have the potential of improving (fluxing, slag melt point, etc.) processing characteristics.

Accordingly, it is a principal feature of the present invention to provide a method for the removal of sulfur dioxide and similar undersirable gases from a gas stream containing gaseous impurities, generated by the combustion of a sulfur-containing fuel or other processes where $SO_2$ and other polluting or undesired gases are generated, which method allows for 90+ percent reduction of the sulfur dioxide content in a manner not heretofore contemplated, through the utilization of nahcolite in the high temperature zone;

It is a further feature of the method of the present invention to provide for the removal of sulfur dioxide or other gas impurities from a gas stream by introducing into a high temperature zone particulate nahcolite, the high temperature zone providing an environment for the thermal crushing of the particulate nahcolite, and an environment for the thermally crushed nahcolite powder to effectively remove the sulfur dioxide;

It is yet a further feature of the present invention to provide such method for the removal of sulfur dioxide from a gas stream which comprises contacting the gas stream in the high temperature zone with thermally crushed nahcolite at a stoichiometric ratio of nahcolite to sulfur dioxide within the range of about 0.9 to about 3.0 and for a period of contact of up to about ten seconds, preferably from about 1 to about 6 seconds.

Still further features and advantages of the method of the present invention will become more apparent from the following, more detailed description thereof.

BRIEF DESCRIPTION OF THE DRAWING

The FIGURE illustrates the effective reduction of sulfur dioxide content through the method of the present invention, varying the stoichiometric ratio of nahcolite to sulfur dioxide and varying the concentration of sulfur dioxide.

DESCRIPTION OF PREFERRED EMBODIMENTS

The features of the present invention and the advantages above described are achieved in accordance with the present invention by introducing into a high temperature zone, such as where a sulfur-containing fuel is being subjected to conditions of combustion, or other processes which generate $SO_2$, particulate nahcolite in an amount effective to reduce the sulfur dioxide content of the flue gas. The high temperature zone provides an environment for the thermal crushing of the particulate nahcolite to produce a reduced size powder. The thermally crushed nahcolite powder is effective in the removal of the sulfur dioxide.

The high temperature zone is maintained at a temperature above 1,500° F, preferably 2,000° to 4,000° F, temperatures typically achieved in the combustion of coal, fuel oil, electric furnaces, etc. Such temperature range is effective to create the desirable thermal crushing environment to produce a comminution of nahcolite. Preferably the particulate nahcolite is brought into direct contact with a high temperature source to promote the thermal crushing of the particulate nahcolite. Direct contact with a flame is one such advantageous way in creating an environment in which thermal crushing is carried out effectively and efficiently.

The thermal crushing is achieved in accordance with the present invention by using nahcolite, a natural occurring ore of sodium bicarbonate. This material can be thermally crushed upon exposure to temperatures above 1,500, perferably between 2,000° and 4,000° F. The thermal crushing of the nahcolite is not appreciably affected by the type of high temperature zone. Any type of burner, boiler or furnace with an oil, gas or coal fuel, or an electric or other energy source, can be conveniently used.

Thermal crushing is believed to be caused by the rapid temperature rise of the particles, the increase in temperature causing the particles to decompose, evaporate water or otherwise evolve gases, i.e., sodium bicarbonate decomposes and $CO_2$ and $H_2O$ gases are evolved. When the gases formed are generated at a higher rate than they can diffuse or escape from the particles, a pressure buildup inside the particles results and this pressure causes the particles to disintegrate or explode into many smaller particles. In this way, the larger nahcolite particles are thermally crushed to a powder having a predominant particle size within the range of from about 0.1 to about 100 microns. Since the overall rate of reaction between a gas and solid depends on particle size, very fast removal of $SO_2$ takes place.

The use of nahcolite provides for the most effective reduction of the sulfur dioxide content of a gas stream, such as that generated by combustion of a sulfur-containing fuel. Nahcolite provides better results than pure sodium bicarbonate. It is presumed that the other minerals present in nahcolite, i.e., sodium carbonate, calcium carbonate, magnesium carbonate, etc., partly react with the sulfur dioxide content of the flue gas due to their small particle size. Apparently, the resultant small thermally crushed particles with high surface area and low resistance to mass transfer make available other alkali compounds for reaction with the gas impurities which adds to the effectiveness of nahcolite. Accordingly, the use of nahcolite in accordance with the present invention allows for 90+ percent sulfur dioxide removal in a manner not heretofore possible with conventional procedures.

The method of the present invention is carried out by introducing particulate nahcolite solids into a boiler, burner, furnace or other typical high temperature zone, produced by burning gas, oil, coal, or other fuel which generates a flue gas that contains sulfur dioxide, or into a high temperature zone of an ore process, etc. The particulate nahcolite can be introduced directly into the high temperature zone with the fuel or the particulate nahcolite can be effectively introduced into a combustion zone with the primary or secondary air. Also, fluid injection, etc., can be utilized. In all cases, effective distribution of the particulate nahcolite solids in the high temperature zone is achieved. This creates the desirable contact between the thermally crushed nahcolite and sulfur dioxide or other impurities to allow the desired removal.

Substantially independent of the particle size of the starting particulate nahcolite, particularly in the size range 14 mesh to 400 mesh, thermal crushing at a temperature within the range of above 1,500° to 4,000° F produces a thermally crushed powder having a predominant particle size within the range of about 0.1 to about 100 microns. Generally, the nahcolite particles introduced into the combustion zone have a particle size ranging from about ½ inch diameter to −400 mesh. Typical particle sizes for nahcolite prior to and subsequent to thermal crushing can be found in the following table:

| Feed | | Thermally Crushed Powder | |
|---|---|---|---|
| Wt. % | Size, Microns | Wt. % | Size, Microns |
| 9.3 | −208 +147 | 35.12 | +10.8 |
| 14.6 | −147 +104 | 1.79 | −10.8 + 6.7 |
| 16.0 | −104 + 74 | 4.76 | − 6.7 + 4.5 |
| 18.4 | − 74 + 61 | 1.19 | − 4.5 + 3.2 |
| 11.3 | − 61 +50.9 | 7.74 | − 3.2 + 2 |
| 30.5 | − 50.9 | 3.57 | − 2 + 1 |
| | | 4.17 | − 1 + 0.6 |
| Mean Size Reduction Ratio = 38:1 | | 4.76 | − 0.6 + 0.4 |
| | | 36.90 | − 0.4 |

$$Dm = \frac{68 \text{ Microns}}{\text{Mass Median Diameter}} \quad Dm = \frac{1.79 \text{ Microns}}{\text{Mass Median Diameter}}$$

Thermal crushing carried out in a burner, boiler, furnace, or other typical high temperature environment provides a size reduction of the initial particulate nahcolite by a factor of ten or more. The very small particle size of the thermally crushed nahcolite powder is at least partly responsible for the effectiveness of nahcolite to reduce the sulfur dioxide content of the flue gas by 90+ percent. The effectiveness of sulfur dioxide removal is dependent on the final small particle size of the thermally crushed nahcolite during contact with the gas pollutants. However, $SO_2$ removal is not appreciably dependent upon the initial particle size of the particulate nahcolite introduced into the high temperature zone.

Moreover, the source of the sulfur dioxide impurities present in the flue gas does not appreciable affect the ability of the thermally crushed nahcolite within the high temperature zone to reduce the sulfur dioxide content of the flue gas. The concentration of sulfur dioxide in the flue gas does not appreciably affect the ability of thermally crushed nahcolite to remove $SO_2$. This is apparently due to the fact that $SO_2$ removal is essentially complete in approximately one to two seconds of contact residence time. However, $SO_2$ concentrations may have some effect on $SO_2$ removal rates for residence times shorter than one second.

It has been determined in accordance with the present invention that nahcolite is effective to reduce the sulfur dioxide content of the flue gas within an extremely short contact time. Generally, the contact residence time available in boilers, furnaces, etc., between the thermally crushed powder and flue gas is no more than about ten seconds, while the contact time required is from about 1 to about 6 seconds. Any longer contact between the thermally crushed powder and flue gas does not provide a correspondingly increased reduction of the sulfur dioxide content.

Furthermore, the thermally crushed powder tends to agglomerate, resulting in larger particles with a passage of time. Accordingly, as the contact between the thermally crushed powder and flue gas continues, the thermally crushed powder will tend to agglommerate and increase in effective size, which reduces the effectiveness of the thermally crushed powder in reducing the sulfur dioxide content of the flue gas. For this reason, prolonged contact times between the thermally crushed powder and the flue gas are not particularly beneficial.

However, this agglomeration of the thermally crushed and reacted powder assists in the removal of the particles from the system after sufficient contact with the flue gas to effectively reduce its sulfur dioxide content. To achieve this removal of the thermally crushed powder from the system, a particle separator is employed downstream of the combustion zone. Such a particle separator can comprise any conventional unit which is effective in the removal of particulate solids from a gas stream. Typical units include, for example, bag houses, electrostatic precipitators, cyclones, scrubbers, etc. Favorable test results with respect to the removal of the thermally crushed and reacted powder have been achieved through the use of an electrostatic precipitator.

When the thermally crushed powder is removed from contact with the flue gas, the thermally crushed powder has combined with it the sulfur dioxide impurities of the flue gas. It is not precisely known whether the thermally crushed powder effectively reduces the sulfur dioxide content of the flue gas through a physical surface absorption of the sulfur dioxide impurities, through a chemical reaction, or through a combination of both. Regardless of the manner in which the sulfur dioxide impurities are removed, the expression "with combined sulfur dioxide" is meant to embrace each of these possibilities and describes the thermally crushed powder in a state in which the sulfur dioxide impurities are so associated with it as to be effectively removed from the system.

In an ideal system, 100 percent of the sulfur dioxide impurities would be removed through the use of the thermally crushed powder at a stoichiometric ratio of thermally crushed powder to sulfur dioxide of 1.0. The system of the present invention, however, acts somewhat less than ideally, primarily due to the phenomenon of fall out and agglomeration which does not allow intimate contact of all of the thermally crushed powder with the sulfur dioxide impurities of the flue gas. For this reason, to achieve the high levels of sulfur dioxide removal in accordance with the present invention, it is often desirable to employ a stoichiometric ratio of thermally crushed powder to sulfur dioxide of greater than 1.0. Generally, the stoichiometric ratio of thermally crushed powder to sulfur dioxide of from about 0.9 to about 3.0 is effective in providing the desired reduction of sulfur dioxide content.

In the preferred mode of carrying out the method of the present invention, particulate nahcolite is injected into a boiler, burner, furnace, or similar high temperature zone. This is achieved by adding the particulate solids to the fuel, gas, oil, coal, etc., or through the primary or secondary air. In either case, effective distribution of the particulate nahcolite in the high temperature zone is achieved. The high temperature zone is at a temperature above 1,500° F, preferably 2,000° to 4,000° F, so as to promote the thermal crushing of the particulate nahcolite and removal of SO$_2$. Nacholite is introduced into the combustion zone so as to provide a stoichiometric ratio of thermally crushed nahcolite to sulfur dioxide within the range of about 0.9 to about 3.0. Generally, the contact time between the thermally crushed nahcolite and generated flue gas containing sulfur dioxide impurities will be up to about ten seconds with a period of contact of from about one to about six seconds being preferred to achieve effective removal of the sulfur dioxide. After such contact time, the flue gas can be passed through a particle separator and the nahcolite powder having combined sulfur dioxide removed. The flue gas can then be passed directly to the atmosphere through an open stack.

The method of the present invention will now be described by reference to the following example which is presented for purposes of illustration only and the present invention cannot, under any circumstances, be deemed limited thereto.

EXAMPLE

To determine the effectiveness of the present invention in the removal of sulfur dioxide from a gas generated by the burning of a sulfur-containing fuel, a typical furnace setup is utilized. In order to initiate in the furnace the desirable environment, the furnace blower is started and the furnace draft is adjusted to a desirable value, with the burner then turned on and a stable flame established. The burner is maintained in this condition until the system reaches equalibrium. Sulfur dioxide gas is then injected into the secondary air of the burner and its concentration adjusted to the desired value. Sulfur dioxide gas is introduced into the combustion or high temperature zone either by injecting SO$_2$ gas or by burning a sulfur-containing fuel. In either case, the sulfur dioxide content can be controlled.

Data is collected on orifice meters and the temperature, pressure, oil level, sulfur dioxide concentration, oxygen concentration, etc. are recorded as a function of time. The system is run under these conditions for a time sufficient to obtain steady reading after which the nahcolite feed is started. The feed of nahcolite is adjusted depending on the desired stoichiometric ratio. A short time is required to stabilize the flow of the particulate nahcolite. In the combustion zone the injected nahcolite first thermally decomposes, forming a thermally crushed powder having a predominant particle size within the range of from about 0.1 to about 100 microns, and the thermally crushed powder then reacts with the sulfur dioxide content of the generated flue gas. The concentration of sulfur dioxide is continuously recorded during the period of injection of the particulate nahcolite and all other data as previously mentioned are recorded. Once a stable sulfur dioxide content reading is obtained, the nahcolite feed is stopped. This results in an increase in the sulfur dioxide concentration back to the original level. All data are again recorded until steady state conditions are achieved. A representative sample of the nahcolite is analyzed for the percent sodium bicarbonate, percent sodium carbonate and percent sodium sulfate. From this data it is possible to determine the effectiveness of the introduction of particulate nahcolite into the higher temperature zone for the removal of sulfur dioxide.

The accompanying figure illustrates data obtained in determing the effectiveness of nahcolite in reducing the sulfur dioxide content in accordance with the present invention. In the experiment which resulted in the data of the accompanying figure, −65 mesh nahcolite (68.4 percent NaHCO$_3$) was injected into the combustion zone with the sulfur dioxide concentration varied from 800 to 2,500 to 5,000 parts per million. The stoichiometric ratio of nahcolite to sulfur dioxide was continuously varied and the percent sulfur dioxide removal calculated from the data obtained. It can be seen from the figure that the removal of sulfur dioxide is independent of the sulfur dioxide concentration and 90+ percent removal can be achieved. The figure also shows the ideal removal of sulfur dioxide with 100 percent being achieved at a stoichiometric ratio of 1.0. The somewhat less than ideal removal achieved by the method of the present invention is the result of the phenomena of fall out and agglomeration.

While the present invention has been described primarily with regard to the foregoing exemplification, it should be understood that the present invention cannot, under any circumstances, be deemed limited thereto but rather must be construed as broadly as any and all equivalents thereof.

What is claimed is:

1. A method of removing sulfur dioxide from a gas stream generated by the combustion of a sulfur-containing fuel, comprising:
    generating a gas stream containing sulfur dioxide by the combustion of a sulfur-containing fuel in a high temperature combustion zone;
    maintaining said high temperature combustion zone at a temperature of from about 2,000° F. to about 4,000° F. by said combustion;
    introducing into said gas stream in said high temperature combustion zone an amount of nahcolite sufficient to provide a stoichiometric ratio of nahcolite to sulfur dioxide of from about 0.9 to about 3.0;
    thermally crushing said particulate nahcolite to a predominant particle size of from about 0.1 to about 100 microns and a mean particle size of less than 10.8 microns by contacting said particulate nahcolite with said gas stream in said high temperature combustion zone;
    allowing said thermally crushed nahcolite and said gas stream to remain in contact in said high temperature combustion zone for a time effective to combine at least some of the sulfur dioxide in said gas stream with said thermally crushed nahcolite; and
    removing said thermally crushed nahcolite with combined sulfur dioxide from said gas stream.

2. The method of claim 1, wherein said thermally crushed nahcolite contacts the gas stream containing sulfur dioxide impurities for a period of up to about ten seconds.

3. The method of claim 2, wherein the period of contact is from about one to about six seconds.

4. The method of claim 1, wherein said particulate nahcolite is introduced into the combustion zone by mixing with the combustion zone fuel.

5. The method of claim 1, wherein said particulate nahcolite is introduced into the combustion zone by mixing with primary or secondary air.

* * * * *